Dec. 21, 1965   R. T. WILSON ETAL   3,224,816
SAFETY DEVICE FOR HYDRAULIC BRAKE DEVICES
Filed June 11, 1963   3 Sheets-Sheet 1

INVENTORS
RAYMOND T. WILSON
ALBERT M. GOODMAN
BY
George B. White
ATTORNEY

INVENTORS
RAYMOND T. WILSON
BY ALBERT M. GOODMAN

George B. White
ATTORNEY

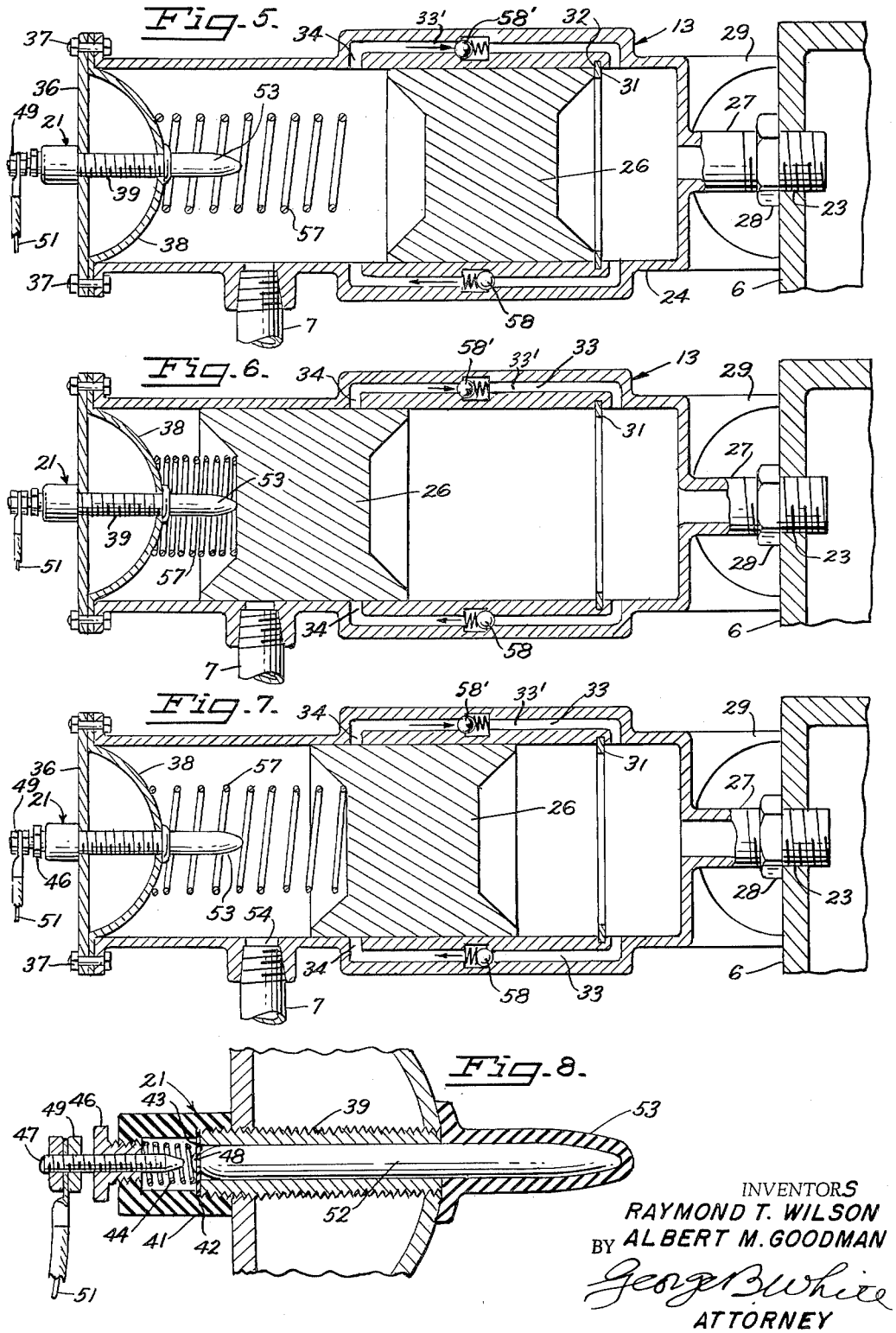

United States Patent Office 3,224,816
Patented Dec. 21, 1965

3,224,816
SAFETY DEVICE FOR HYDRAULIC
BRAKE DEVICES
Raymond T. Wilson, 238 Leavenworth St., San Francisco, Calif., and Albert M. Goodman, P.O. Box 546, Belvedere-Tiburon, Calif.
Filed June 11, 1963, Ser. No. 287,115
3 Claims. (Cl. 303—84)

This invention relates to a safety device for hydraulic brake devices.

A frequent cause of many automobile accidents can be traced to defective brakes due to failure of hydraulic brake systems. The defect can be traced either to breakdown at the brake shoe or leak in the line leading to a particular brake shoe or at the brake cylinder; in some instances there is a leakage or breakdown of the master cylinder.

The primary object of our invention is to provide a simple and efficient device which can be combined with the master cylinder of a hydraulic brake system and which is capable of automatically shutting off the brake fluid flow to any individual line in the event of breakdown at the brake shoe; and which is also capable of replacing lost brake fluid in the master cylinder automatically, and when the replacement exceeds a certain predetermined quantity, then automatically actuate a warning signal to the operator.

Particularly it is an object of the invention to provide at the outlet of the master cylinder a plurality of automatic shut-off devices, one such device between each brake line and said master cylinder outlet, thereby to achieve individual shut-off of the device in the event of failure at any brake line; and also to provide a reservoir for the master cylinder for automatic replacement of lost fluid and an automatic signalling device on the reservoir to actuate a warning signal when the fluid loss replaced from the reservoir exceeds a predetermined amount.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 5 is a sectional detailed view of one of the shut-off devices between the master cylinder and the line for the brakes showing the shut-off valve in open position.

FIG. 6 is a sectional view of the shut-off device showing the piston in extreme shut-off position actuating the switch and the alarm device.

FIG. 7 is a sectional view of the shut-off device showing the piston valve still in shut-off position but after release of the alarm switch.

FIG. 8 is a fragmental sectional view on an enlarged scale of the alarm switch in the shut-off device.

Figure 1:
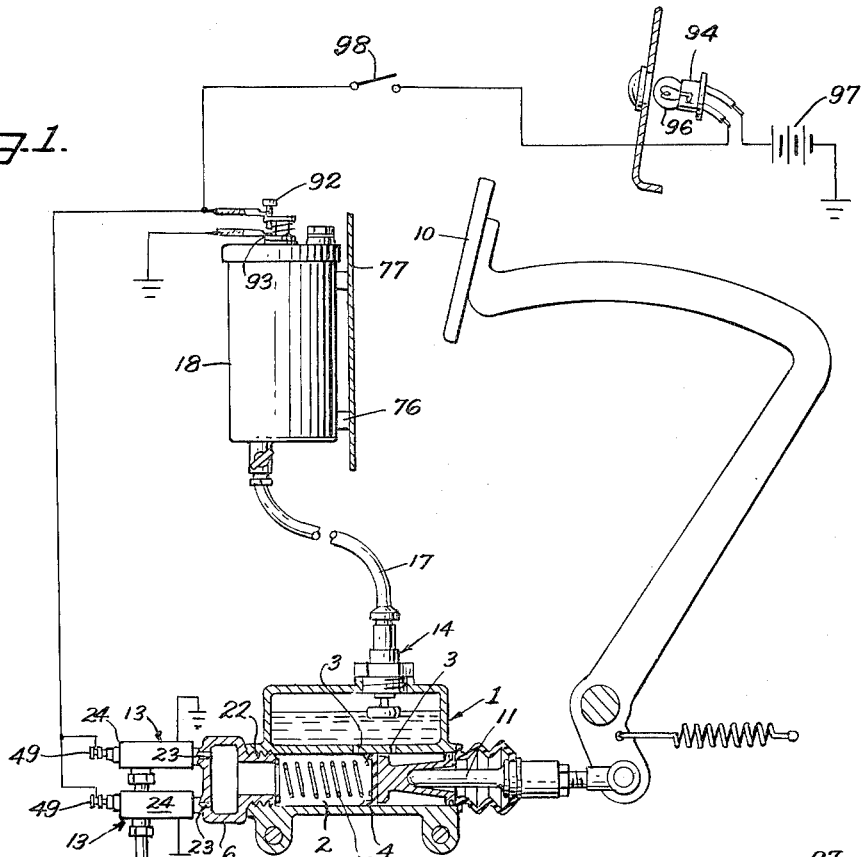
FIG. 1 is a partially diagrammatic view showing the hydraulic brake system of an automobile with the safety and warning devices thereon.

In the illustrative embodiment of the invention herein the master cylinder 1 has thereon an outlet cylinder 2, connected by usual passages 3 so that a piston 4 working in the outlet cylinder 2 can exert pressure toward the outlet head 6 and thereby apply the hydraulic pressure through brake lines 7 to the brake cylinders 8 at the usual brake shoes indicated at 9, thereby to apply the brakes. The piston 4 has on it usual piston rod 11 which latter is suitably connected to the brake pedal shown at 10. A coil spring 12 in the outlet cylinder 2 normally urges the piston 4 toward the brake pedal so as to keep the communicating passage 3 from the master cylinder 1 unobstructed.

On the outlet head 6 there are plurality, in this illustration four, of individual shut-off devices 13 so as to be interconnected between the outlet head 6 and the respective brake line 7.

The intake plug 14 of the master cylinder 1 contains a float controlled intake valve 16. A suitable feed line 17 connects a reservoir 18 to the float controlled intake valve 16. The reservoir 18 is located in a convenient relation to the master cylinder and has a float controlled switch 19 thereon for actuating a warning signal in a manner to be hereinafter described.

Each shut-off device 13 is also provided with a suitable switch 21 actuated by the shut-off device 13 for actuating a warning signal.

The master cylinder 1 is in the usual form and in the present illustration the outlet cylinder 2 is along the bottom thereof. The outlet head 6 in this illustration has a plug stem 22 threaded in the outlet end of the outlet cylinder 2. In the present illustration there are four threaded holes 23 on the outlet head 6. Into each threaded hole is secured one of the shut-off devices 13. Each shut-off device 13 includes a valve cylinder 24 in which works a free piston valve 26. On the intake end of the valve cylinder 24 is a central tube 27 externally threaded so as to be screwed into the respective threaded hole 23 and thus communicate the valve cylinder 24 with the outlet head 6. A lock nut 28 on the tube 27 fixes the position of the valve cylinder 24. In order to facilitate the tightening and loosening of the lock nut 28 spacer fins 29 are extended from the bottom of the valve cylinder 24 and abut against the outside of the outlet head 6 so as to brace the valve cylinder 24 in position.

A stop ring 31 secured in a groove 32 inside the valve cylinder 24 determines the backstroke of the piston valve 26 spaced from the bottom of the cylinder so as to allow the pressure medium or brake fluid to enter through the tube 27 into the valve cylinder 24 and work against the adjacent face of the piston valve 26. One or more by-pass passages 33 extend from the area of the cylinder between said stop ring 31 and the bottom of the cylinder to an area spaced from the other face of the piston valve 26. The outlets 34 of the by-pass passages 33 are spaced from the piston 26 at a distance to be covered by the piston 26 in the forward position of the piston in the event of a breakdown in the brake line as indicated in FIG. 6 and FIG. 7. The outer end of the valve cylinder 24 has an end cover 36 suitably secured in place, for instance by bolts 37. This end cover 36 holds in place an inwardly dished bearing plate 38 so as to provide a firm support for a sleeve 39, which sleeve is threaded through the bearing plate 38 and also through the end cover 36 and extends to the outside of the end cover 36. A hollow nut 41 is threaded on the projecting end of the sleeve 39 so as to bear against the outside of the end cover 36. A shoulder 42 in the hollow nut 41 bears against and holds in position a flexible switch plate 43. The hollow nut 41 is made of an electrical insulating material. A coil spring 44 inside of the hollow nut 41 bearing against the closed end of the insulating nut normally urges the flexible switch plate away from the closed end of the hollow nut 41. In the closed end of the hollow nut 41 is threaded a bushing 46 into which latter is threadedly secured a terminal bar 47 projecting to a suitable gap opposite a contact button 48 on the flexible switch plate 43. On the outer end of the terminal bar 47 are provided the usual terminal nuts 49 for connecting through an electric wire 51 to the warning circuit. Inside the sleeve 39 is slidable a switch bar 52 bearing against the central portion of the flexible switch plate 43. The switch bar 52 extends inwardly beyond the bearing plate 38 and the inner end thereof is covered by a compressible insulator jacket 53 suitably secured, such as by vulcanizing or adhesive, to the dished bearing plate 38. The switch bar 52 is grounded through the sleeve 39. The inner insulated end of the switch bar 52 projects in the path of the piston 26 so that in the extreme forward position of the piston valve 26 the insulator jacket is compressed and the switch bar 52 is pressed against the flexible switch plate 43 to contact the button 48 with the end of the terminal bar 47 and thus close the warning circuit of the particular shut-off device 13. A suitable outlet 54 is connected to the conduit or brake line 7, which latter leads to the brake shoe actuating device such as the usual brake cylinder 8. A coil spring 57 bears at one end against the dished bearing plate 38 and in the expanded position has its other end extended to about the by-pass outlet 34 so as to return the piston after each actuation to the position shown in FIG. 5 sitll covering the by-pass outlets 34. One by-pass passage 33 has a suitable check valve 58 inserted so as to permit passage of brake liquid only toward the outlets 34 and to check backflow toward the outlet head 6. The other passage 33' has a by-pass valve 58' therein which slows the backflow to the extent of the spring pressure of the check valve 58'.

Thus, whenever pressure is exerted on the brake fluid by the operation of the brake pedal the fluid will flow through the by-pass passages 33 and through the outlets 34 to the brake line 7 and the brake cylinder 8 to apply the necessary force for braking. The pressure on the opposite sides of the piston valve 26 is substantially equalized so that the piston valve 26 in normal operation remains in position. The back pressure exerted by the springs of the brake shoes on the brake fluid in the brake lines 7 will normally hold the piston valve 26 against the stop ring 31. Whenever there is extreme leakage or the hydraulic fluid pressure for any reason breaks down in any brake line 7, the balance is upset and the pressure exerted by the brake pedal forces the brake fluid against the piston valve 26 and shifts the piston toward the end cover 36 of the valve cylinder 24 compressing the coil spring 57 and also compressing the insulator jacket 53 to move the switch bar 52 into circuit closing position. After the signal the spring 57 returns the piston valve 26 to the intermediate position to keep the by-pass outlets 34 covered. The coil spring 44 returns the flexible switch plate 43 and switch bar 52 to their initial circuit-opening position. After the trouble at the particular wheel brake is remedied, pressure is introduced into the brake line 7 preferably through filling it with brake fluid and then the pressure of the brake shoe is applied so as to bear against the piston valve 26 and shift it back against the stop ring 31, whereupon the normal operation of the particular shut-off device 13 is resumed.

The intake plug 14 of the master cylinder 1 has a threaded passage 61 into which is secured a tube 62 having a valve seat 63 facing inwardly of the plug 14. In the end of the tube 62 beyond the valve seat 63 is slidable a tubular float stem 64, a portion of which corresponding to the distance between the valve seat 63 and the inner end of the tube 62 is provided with perforations 66. An abutment plug 67 is secured to the inner end of the tube 62 and a collar 68 on the exterior of the tube 62 limits the descent of the tubular stem 64. On the inner end of the tubular stem 64 is a float 69 so that when the float 69 is lowered by the lowering of the level of the fluid in the master cylinder 1, additional fluid can flow through the open valve seat 63 and through the perforations 66 and through the tubular stem 64 to replenish the brake fluid in the master cylinder 1. At normal level of the brake fluid the float 69 forces the conical end 71 of the float stem 64 on to the valve seat 63 to shut off the fluid flow. The feedline 17 is suitable flexible tubing connected by suitable coupling 72 to the outer end of the cylinder intake tube 62.

The reservoir 18 is a suitable tank which may be made of clear or transparent plastic so as to permit observation of the fluid level. This reservoir 18 may be supported by suitable brackets 76 on any wall or supporting surface 77 on the vehicle, or the tank may be directly connected and supported on the master cylinder intake tube 62. In the present illustration the flexible feedline 17 is connected by a suitable coupling 78 to the bottom 79 of the reservoir 18. The top 81 of the reservoir has a guide plug 82 therein in which is slidable a tubular post 83. Inside the tubular post 83 is slidable a loaded float stem 84 on which a float 86 is suspended. The post 83 has a threaded head 87 on its inner end. The loaded float stem 84 has a sliding head 88 inside the tubular post 83 which rests upon the threaded head 87 when the float is lowered to a distance substantially equal to the full length of the stem 84. On the top of the tubular post 83 is an insulator head 89 engaged by a light spring 91 between the insulating head and the top of the guide plug 82 to hold the post in circuit-opening position. The insulating head 89 has a contact terminal 92 suitably connected to a warning circuit, and the guide plug 82 has a grounded contact terminal 93. Normally the spring 91 spaces the insulating head 89 so as to keep the contact terminals 92 and 93 apart. When the reservoir fluid level is lowered to a dangerous low level, the float pulls the telescoping stem 84 to the bottom of the tubular post 83 and the combined weight overcomes the light spring 91 and pulls the insulating head 89 the short distance required to close the gap between the contact terminals 92 and 93 and thereby close the warning circuit.

As shown in the wiring diagram in FIG. 1, all the sleeves 39 and the reservoir ground terminal 93 are connected to the ground and thus to the ground terminal of the battery 97. The other terminal of the battery 97 is connected to a socket 94 and then through the socket 94 and the key switch 98 in parallel to the respective terminal nuts 49 of the respective shut-off devices 13 and to the contact terminal 92 of the reservoir in parallel so that the closing of any of the circuits will close the circuit of the warning signal and turn on the warning light 96.

Figure 9:
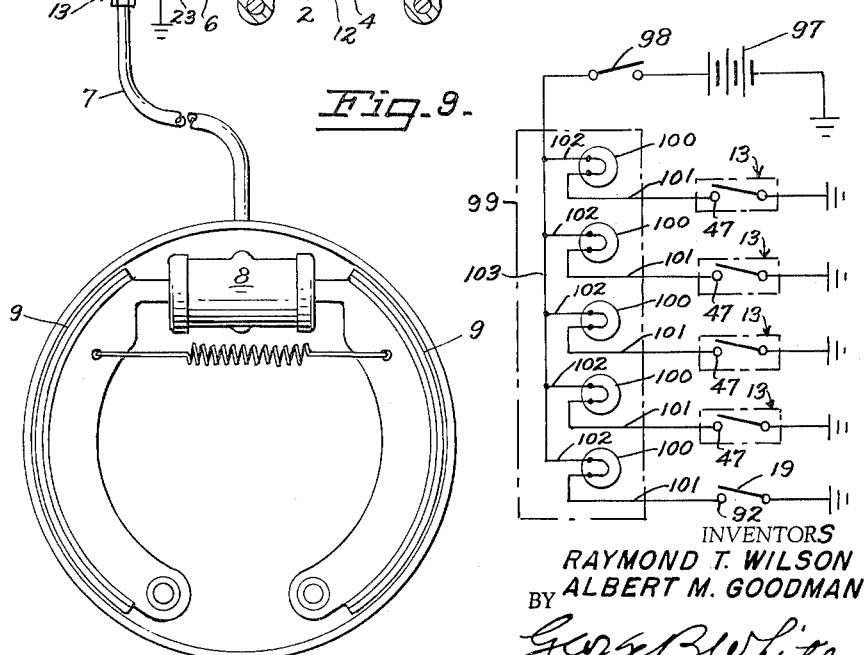
FIG. 9 is a wiring diagram of the system with separate signal devices for each brake line shut-off and for the reservoir.
Figure 2:
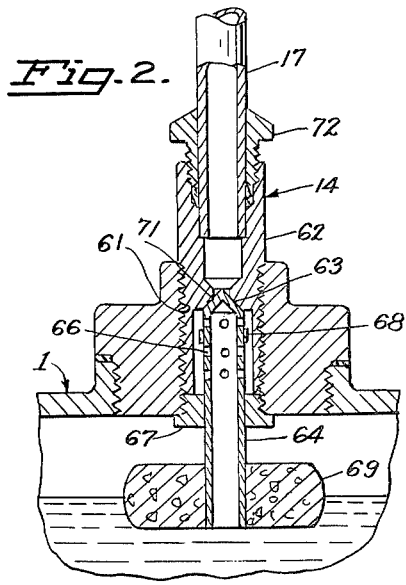
FIG. 2 is a fragmental sectional view of the intake device on the master cylinder with the float controlled valve.
Figure 3:
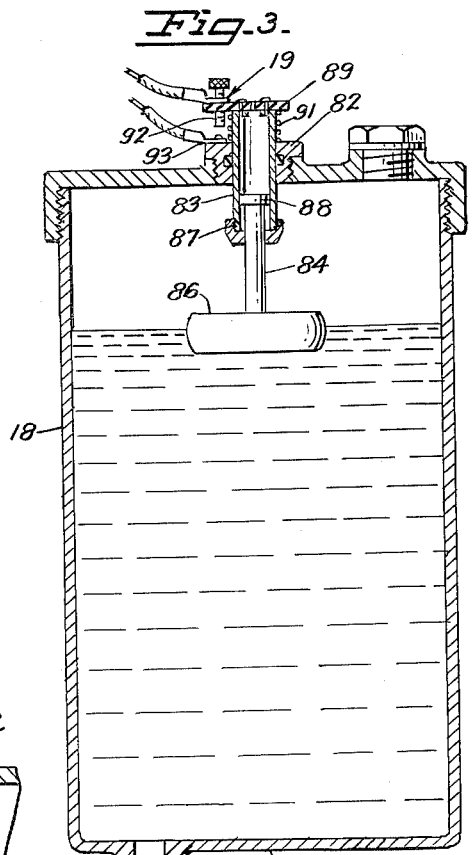
FIG. 3 is a sectional view of the reservoir with the float controlled switch for the warning system.
Figure 4:
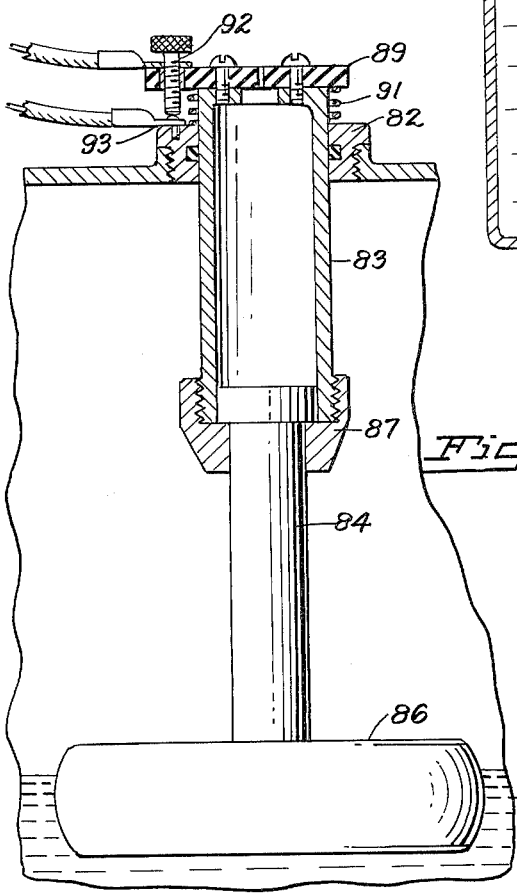
FIG. 4 is a fragmental sectional view on an enlarged scale of the float switch of the reservoir.

In FIG. 9 is shown a wiring diagram wherein a separate signal device, such as a separate light, is provided on the dashboard for each shut-off device 13 and a separate signal device or light for the reservoir switch 19. As indicated schematically in FIG. 9 a small auxiliary panel 99 is provided which can be suitably mounted on the dashboard of the automobile. On this auxiliary panel 99 are provided five electric lights 100. The ground terminal 101 of each of four lights 100 is connected to one of the terminal bars 47 of a shut-off device 13. The ground terminal 101 of the fifth light is connected to the terminal 92 of the reservoir switch 19. The individual live terminals 102 of each of the lights are connected to a line 103 through the ignition switch 98 to the battery 97, thus upon the closing of each shut-off device 13 a certain predetermined signal is actuated. The four shut-off signal lights 100 are suitably marked so that the operator can read on the dashboard which wheel brake is inoperative. When this fifth light is actuated it indicates that the brake fluid in the reservoir is too low.

We claim:

1. In a safety device for hydraulic brakes of a vehicle having a brake operating device and hydraulically actuated wheel brakes,
    (a) a master cylinder,
    (b) an outlet head at one end of said master cylinder,
    (c) four outlets on said outlet head,
    (d) a shut-off cylinder secured in each outlet,
    (e) a freely reciprocable piston in each sut-off cylinder,
    (f) an outlet on a side of each shut-off cylinder connected to one of said wheel brakes,
    (g) means to limit the movement of the piston toward said outlet head so as to admit fluid from said master cylinder and through said outlet head into the shut-off cylinder to exert pressure on said piston toward the outlet of the shut-off cylinder,
    (h) an intake port on said side of said shut-off cylinder between the piston and said outlet of said shut-off cylinder communicating with the intake end of the shut-off cylinder to transmit fluid from the intake side of the piston to the outlet side of the piston,
    (i) said piston being of a length less than the distance between said limit means and said outlet port so as to leave said outlet port uncovered by the piston in the balanced position of the piston thereby to maintain substantially balanced pressure on the opposite sides of the piston,
    (j) a coil spring between the outlet end of the shut-off cylinder and said piston, said coil spring being of such length that when fully expanded the coil spring pushes said piston to a shut-off position covering said intake port, thereby to return said piston to said shut-off position when said piston is moved toward said outlet end by unbalancing of pressure caused by fluid loss through said outlet port.

2. In a safety device for hydraulic brakes of a vehicle, as defined in claim 1, and
    (k) a reservoir for brake fluid,
    (l) a connection between the reservoir and the master cylinder including,
    (m) an intake plug on the master cylinder having a valve seat therein,
    (n) a valve seated on the valve seat to shut-off flow from said reservoir to said master cylinder,
    (o) a valve float in the master cylinder below said intake plug,
    (p) a valve stem on said valve float holding said valve on said seat at normal fluid level in the master cylinder and opening said valve from said seat when the valve float is lowered by loss of fluid from the master cylinder.

3. In a safety device for hydraulic brakes of a vehicle as defined in claim 2, and
    (q) a signal float floating on the fluid in said reservoir,
    (r) a normally open switch on the outside of said reservoir,
    (s) a switch actuator for closing said switch,
    (t) means to connect said float to said actuator with freedom of limited play for moving said actuator to close said switch when the fluid level in said reservoir lowers beyond a predetermined limit,
    (u) and a signal circuit operated by said switch.

References Cited by the Examiner

UNITED STATES PATENTS

| 247,867 | 10/1891 | Wright | 137—432 |
| 2,625,951 | 1/1953 | Owens. | |
| 2,664,101 | 12/1953 | Cano et al. | 303—84 X |
| 2,814,532 | 11/1957 | Stephanski | 303—84 |

MILTON BUCHLER, *Primary Examiner.*

FERGUS S. MIDDLETON, *Examiner.*